(12) United States Patent
Klimpel

(10) Patent No.: US 10,888,722 B2
(45) Date of Patent: Jan. 12, 2021

(54) ADJUSTABLE BREATHING APPARATUS

(71) Applicant: Russell Klimpel, Ryder, ND (US)

(72) Inventor: Russell Klimpel, Ryder, ND (US)

(*) Notice: Subject to any disclaimer, the term of this patent is extended or adjusted under 35 U.S.C. 154(b) by 357 days.

(21) Appl. No.: 15/633,512

(22) Filed: Jun. 26, 2017

(65) Prior Publication Data

US 2018/0369620 A1 Dec. 27, 2018

(51) Int. Cl.
*A62B 23/00* (2006.01)
*A62B 7/10* (2006.01)
*B01D 46/10* (2006.01)

(52) U.S. Cl.
CPC ............... *A62B 23/00* (2013.01); *A62B 7/10* (2013.01); *B01D 46/103* (2013.01)

(58) Field of Classification Search
CPC ......... A62B 9/06; A62B 18/02; A62B 18/025; A62B 18/086; A62B 23/02; A62B 23/025; A62B 23/00; A62B 7/10; A61M 16/00; A61M 16/0048; A61M 16/049; A41D 13/11; A63B 23/032; B01D 46/103
See application file for complete search history.

(56) References Cited

U.S. PATENT DOCUMENTS

| | | | | |
|---|---|---|---|---|
| 3,731,678 A * | 5/1973 | Pyzel | ..................... | A62B 23/02 128/202.26 |
| 4,630,604 A * | 12/1986 | Montesi | ............... | A62B 18/025 128/206.15 |
| 4,981,134 A * | 1/1991 | Courtney | ............. | A62B 18/025 128/206.15 |
| 5,033,507 A * | 7/1991 | Pouchot | ................. | A62B 23/02 128/205.29 |
| 5,226,412 A * | 7/1993 | Winters | ................. | A62B 23/00 128/205.29 |
| 7,025,060 B1 * | 4/2006 | Nicholson | .............. | A62B 23/06 128/206.17 |
| 7,114,496 B1 * | 10/2006 | Resnick | ................. | A62B 23/02 128/201.25 |
| 2009/0133700 A1 * | 5/2009 | Martin | ................... | A62B 18/10 128/207.12 |
| 2009/0151728 A1 * | 6/2009 | McConnell | .............. | A62B 7/10 128/206.19 |
| 2015/0258355 A1 * | 9/2015 | Folkvord | ............... | A41D 13/11 128/205.29 |
| 2016/0121144 A1 * | 5/2016 | Hyde | ....................... | A62B 7/10 128/206.11 |

* cited by examiner

*Primary Examiner* — Kendra D Carter
*Assistant Examiner* — Thao Tran
(74) *Attorney, Agent, or Firm* — Andrew Morabito

(57) ABSTRACT

A filter mask comprising a base plate having a first opening and a second opening, a mouth piece having a first end and second end wherein the first end of the mouth piece is attached to first opening of the base plate, a unidirectional exhaust port attached to the second opening of the base plate, a filter fitted to the base plate, wherein the first opening and the second opening are covered by the filter, a filter lock detachably engaged with the base plate wherein the filter is secured to the base plate.

8 Claims, 4 Drawing Sheets

ADJUSTABLE BREATHING APPARATUS

BACKGROUND OF THE INVENTION

The present invention relates to breathing apparatus, and more particularly to breathing apparatus that provides adequate ventilation for users with facial hair.

Air filtration masks (referred to herein as "filter masks") are widely used to protect people from air borne contaminants and gasses. For example, air borne dust particles are a known hazard commonly on work sites. Consequently, workers normally wear filter masks to avoid inhaling the dust particles. To that end, filter masks used in this application are manufactured with a filter material specified to prevent, among other things, a substantial majority of dust particles from being inhaled by the worker.

In addition to primarily filtering inhaled air, some filter masks are specifically manufactured to filter both inhaled and exhaled air. For example, hospital staff often wear filter masks to prevent both their germs from infecting patients, and patients' germs from infecting them.

There is a need in the art to improve the method in which the filter masks fit on the wearer's face if they have a beard. The beard may cause the filter mask to not sit correctly on the wearer's face or may create itchiness or irritation to the wearer's face from the ill-fitting mask rubbing against the wearer's face and cause discomfort.

The present inventions are either too bulky to be used efficiently and without the wearing experiencing various other degrees of discomfort from the weight or size of the filter mask or are simply not large enough to fit the beard of the wearer.

Thus, it is desired for a filter mask to be used by wearer's with beards but to have the filter mask be comfortable and also effective at filtering out air borne contaminants and gasses.

SUMMARY

Aspects of an embodiment of the present invention discloses a filter mask comprising, a base plate having a first opening and a second opening, a mouth piece having a first end and second end wherein the first end of the mouth piece is attached to first opening of the base plate, a unidirectional exhaust port attached to the second opening of the base plate, a filter fitted to the base plate, wherein the first opening and the second opening are covered by the filter, and a filter lock detachably engaged with the base plate wherein the filter is secured to the base plate.

Another aspect of an embodiment of the present invention discloses a filter mask comprising, a base plate having a first opening, a mouth piece having a first end and second end wherein the first end of the mouth piece is attached to first opening of the base plate, and wherein distal to the first end of the mouth piece a unidirectional exhaust port is located, a filter fitted to the base plate, wherein the first opening and the second opening are covered by the filter, and a filter lock detachably engaged with the base plate wherein the filter is secured to the base plate.

Another aspect of an embodiment of the present invention discloses a filter mask comprising, a base plate having a first opening and a second opening, a mouth piece having a first end and second end wherein the first end of the mouth piece is attached to first opening of the base plate, a unidirectional valve fitted over the second opening in the base plate to allow for the expulsion of air, a filter fitted to the base plate, wherein the first opening and the second opening are covered by the filter, and a filter lock detachably engaged with the base plate wherein the filter is secured to the base plate, wherein once the filter lock is engaged with the base plate substantially all of the air entering the mouth piece passes through the filter.

DETAILED DESCRIPTION OF THE INVENTION

The products of the present invention provide a filter mask that is designed to be used by wearers with beards or wearer's that have sensitive skin or allergic reactions to the materials used in the current design of filter masks and cannot have a filter mask in direct contact with their face or head.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. It is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Unless defined otherwise, all technical and scientific terms used herein have the same meaning as commonly understood by one of ordinary skill in the art to which this invention belongs. Although any methods and materials similar or equivalent to those described herein may also be used in the practice or testing of the present invention, the preferred methods and materials are now described.

It must be noted that as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

Figure 1:
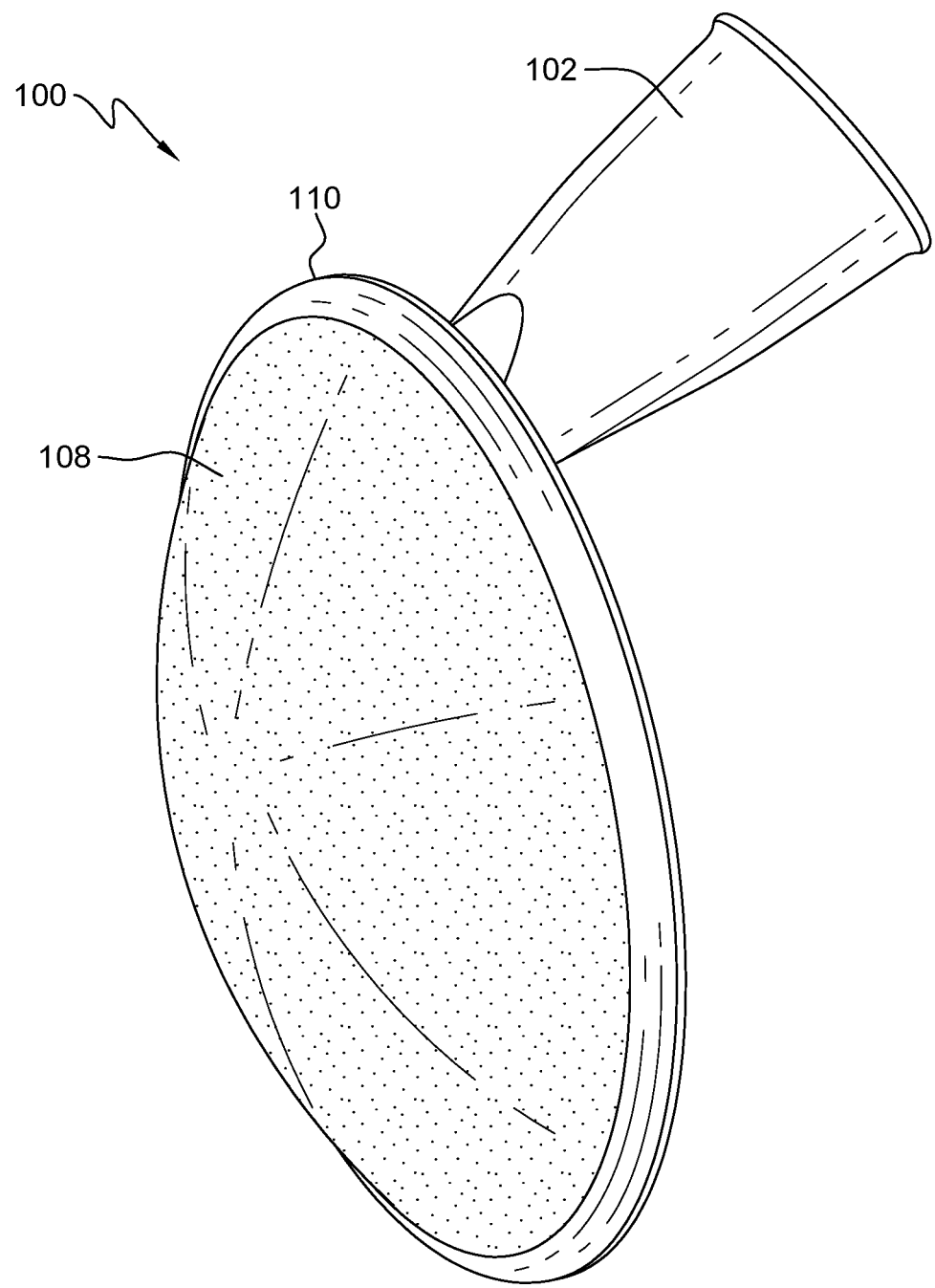
FIG. 1 depicts a front isometric view of a filter mask, in accordance with one embodiment of the present invention.

FIG. 1 depicts a front isometric view of a filter mask 100, in accordance with one embodiment of the present invention. In the depicted embodiment, the filter mask 100 is comprised of a filter 108, a filter lock 110, and the mouth piece 102.

The mouth piece 102 used by the wearer to inhale ventilated air and exhale through. In the depicted embodiment, the mouth piece is an elongated tube with an ergonomic end to allow for a comfortable fit within the wearer's mouth. In additional embodiments, various lengths of the mouth piece 102 and contours of the end of the mouth piece 104 may be employed based on the wearer. The length of the mouth piece 102 is a predetermined distance, so that the filter mask 100 is positioned close to the wearer's face without touching the wearer's face, but not a length that would result an excess mouth and face muscle strain by the wearer. It is desired that the filter mask 100 when used will protect the wearer's nose from airborne contaminants and particles but the wearer can still breath comfortably through their nose when not in a contaminated area. The mouth piece may have varying internal and external contours, and diameters. The mouth piece 102 may also have tabs that extend out similar to a snorkel mouth piece to help provide a larger area for the wearer to fit within their mouth and provide a more comfortable experience while using. The mouth piece 102 may be made from a rigid or flexible material, such as, but not limited to, low-density polyethylene (LDPE), high-density polyethylene (HDPE), polypropylene (PP), polyvinyl chloride (PVC), polystyrene (PS), nylon, teflon (Polytetrafluoroethylene), thermoplastic polyurethanes (TPU), or the like.

A filter 108 is placed between the filter lock 110 and a base plate. The filter is used to remove the contaminates and gasses from the air that the wearer is breathing in. this can be during construction, in a hospital, or anywhere that the wearer could use the filter mask 100. The filter 108 may be manufactured from any conventionally known filter material used for such purposes. The appropriate filter material, however, is selected based upon the intended use of the filter mask 100. Specifically, the filter material is selected based upon the material characteristics (i.e., porosity, rigidity . . . ) required for the intended use. For example, the filter 108 may be constructed from polypropylene manufactured to comply with the well-known P100 NIOSH (National Institute of Safety and Health) standard. Details of the P100 NIOSH standard can be obtained from NIOSH, OSHA (Occupational Safety and Health Administration), or the like.

The filter lock 110 is designed to securer the filter 108 against a base plate (not shown). In the depicted embodiment, the filter lock 110 is a substantially circular ring that fits over the filter 108 and against the back plate. The purpose of the filter lock 110 is to secure the filter 108 to the base plate so that the substantially all of the air which enters the mouth piece 102 and is inhaled by the wearer must pass through the filter 108. In one embodiment, the filter lock 110 is an elastic material that is sized to fit securely against the filter 108 and apply adequate pressure against the base plate to remain in place. In another embodiment, the filter lock 110 is a rigid material that attaches to the back plate through a locking mechanism. The attachment means may be a locking mechanism such as a snap, pressure, a fastener, or a protrusion that is designed to mate with a reciprocal feature of the base plate to secure the filter lock 110 and the base plate together. In yet another embodiment, the filter lock 110 has an adhesive material that secures the filter 108 to the base plate.

Figure 2:
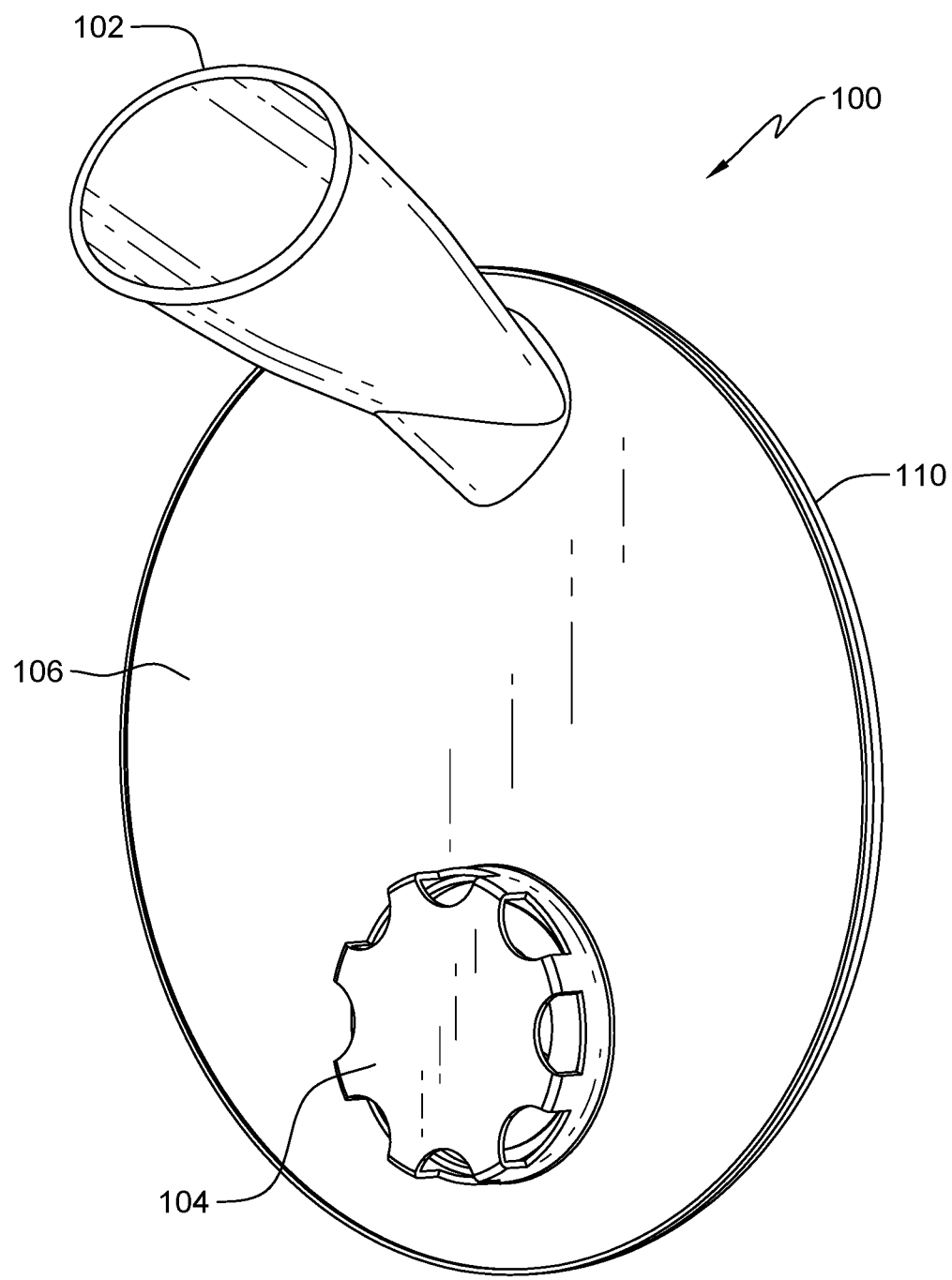
FIG. 2 depicts a rear isometric view of the filter mask, in accordance with one embodiment of the present invention.

FIG. 2 depicts a rear isometric view of the filter mask 100, in accordance with one embodiment of the present invention. In the depicted embodiment, the base plate 106, an exhaust port 104, the mouth piece 102, and the filter lock 110 are shown. In the depicted embodiment, the mouth piece 102 is attached to the base plate 106 above the exhaust port 104. In additional embodiments, the location of the where the mouth piece 102 and the exhaust port 104 are attached to the base plate 106 may be modified and/or altered.

The base plate 106 is the main element of the filter mask 100 that provides the structural support for the filter mask 100 and an element for which the mouth piece 102, the exhaust port 104, and the filter lock 110 attach to. In the depicted embodiment, the base plate 106 is substantially circular. In additional embodiments, the base plate 106 may have various shapes. The base plate 106 is made from a solid non-porous material such as, but not limited to, the mouth piece 102 may be made from a rigid or flexible material, such as, but not limited to, low-density polyethylene (LDPE), high-density polyethylene (HDPE), polypropylene (PP), polyvinyl chloride (PVC), polystyrene (PS), nylon, teflon (Polytetrafluoroethylene), thermoplastic polyurethanes (TPU), a composite material, or the like know to one skilled in the art. In one embodiment, the mouth piece 102 and the exhaust port 104 are permanently adhered to the base plate 106. In additional embodiments, the mouth piece 102 and the exhaust port 104 are detachable/removable from the base plate 106 provided when the mouth piece 102 and the exhaust port 104 are attached to the base plate 106 they form an air tight seal. This seal can be from the use of an adhesive or a secure fitment. In the depicted embodiment, the mouth piece 102 extends from the base plate 106 a predetermined angle to provide the most ergonomic design. The base plate 106 is sized to cover from approximately the nose to the chin of the wearer.

The exhaust port 104 assists the expulsion of air that is exhaled by the wearer. The exhaust port 104 provides an addition exit for the air if the wearer is exhaling more air than which is able to quickly and efficiently exit through the filter 108. The added exit ports for the wearers exhales assists in reducing unnecessary moisture on the filter 108, increasing the life span of the filter 108. In one embodiment, the exhaust port 104 is a one-way port to reduce the possibility of air entering through the exhaust port 104. In one embodiment, the exhaust port 104 is a multi-component design comprised of a housing and a gate. The gate is a flexible solid material that is attached to the housing and when the wearer inhales, the gate presses against the housing and creates a substantially complete seal hindering any air from entering the internal compartment that then enters the wearer's lungs. In one embodiment, the exhaust valve 104 is attached or integrated with the mouth piece 102.

The filter 108 may restrict the quantity of air and the speed of the air which is being exhaled from the wearer, so the exhaust port 104 allows additional exits for the air so that the wearer can use the mask filter 100 without any resistance to their normal breathing pattern. In additional embodiments, there may be multiple exhaust ports 104 The exhaust valve 104 may have other embodiments, of one way valves to accomplish this task as well. This may involve the use of springs, stoppers, plugs, or the like.

Figure 3:
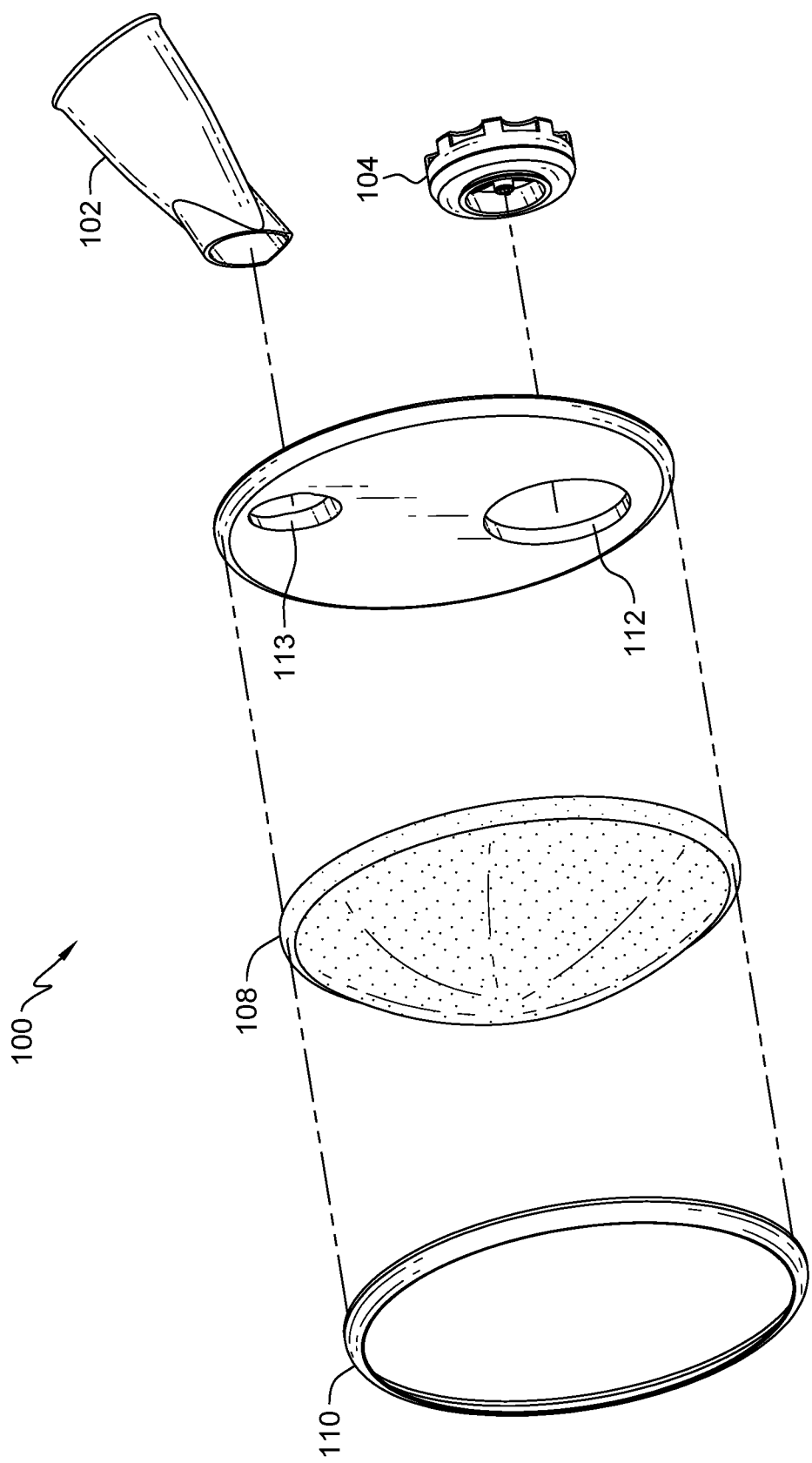
FIG. 3 depicts an exploded view of the filter mask, in accordance with one embodiment of the present invention.

FIG. 3 depicts an exploded view of the filter mask, in accordance with one embodiment of the present invention. The depicted embodiment shows the filter lock 110, the filter 108, the base plate 106, the mouth piece 102 and the exhaust port 104.

The base plate 106 has a first opening 112 and a second opening 113 in predetermined locations. The first opening 112 and the second opening 113 extend completely through the base plate 106 The first opening 112 is where the mouth piece 102 is attached to the base plate 106. The second opening 113 is where the exhaust port 104 is attached to the base plate 106. The diameter of the first and second opening 112 and 113 is dependent upon the size of the mouth piece 102 and the exhaust port 104 respectively. As well as the location of the first opening 112 and the second opening 113 may be adjusted or moved. In one embodiment, a portion of the first opening 112 and the second opening 113 overlap and the exhaust port 104 and the mouth piece 102 are a unitary element. In additional embodiment, where the exhaust port 104 and the mouth piece 102 are a unitary element the first opening 112 and the second opening 113 do not overlap and are two separate and distinct openings. In some embodiments, additional filters are fitted over the first opening 112 and/or the second opening 113.

In the depicted embodiment, the base plate 106 is a substantially flat disc. In one embodiment, the base plate 106 has a concave designed to contour to the wearer's face to provides a much coverage and protection as possible without coming in direct contact with the wearer's face. The base plate 106 is a predetermined thickness to provide structural rigidity.

Figure 4:
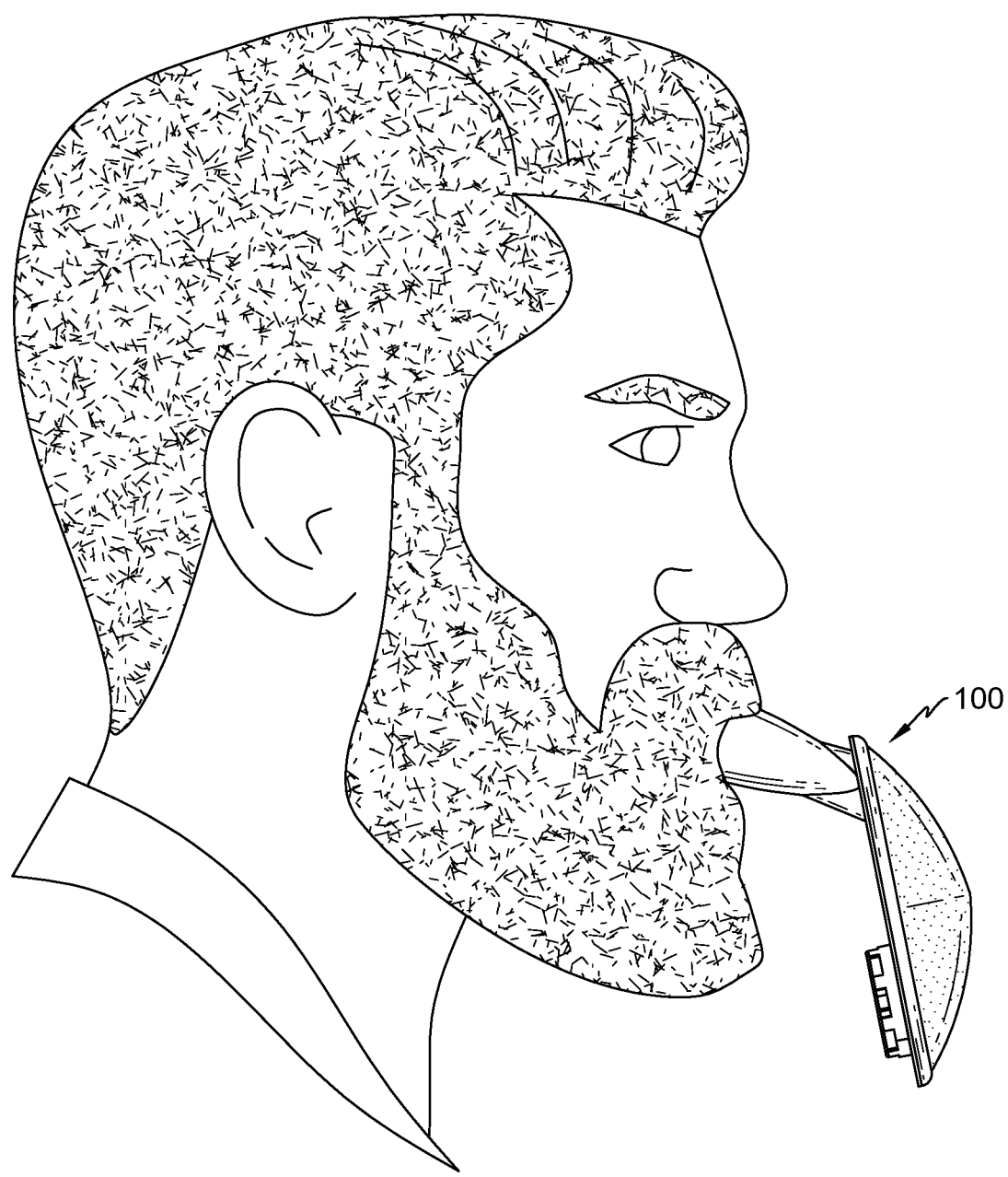
FIG. 4 depicts a view of the filter mask in use on a wearer, in accordance with one embodiment of the present invention.

FIG. 4 depicts a view of the filter mask 100 in use on a wearer, in accordance with one embodiment of the present invention. In the depicted embodiment, the filter mask 100 is shown covered the nose to the chin of the user while inserted in their mouth. It is shown how the beard of the wearer is not obstructing the filtering effect of the filter mask 100 and the filter mask 100 is not irritating the wearer by pressing against their beard.

In some embodiments, base plate 106, the mouth piece 102, and the exhaust port 104 are a unitary design.

The invention is inclusive of combinations of the embodiments or embodiments described herein. References to "a particular embodiment" or "embodiment" and the like refer to features that are present in at least one embodiment of the invention. Separate references to "an embodiment" or "particular embodiments" or "embodiments" or the like do not necessarily refer to the same embodiment or embodiments; however, such embodiments are not mutually exclusive, unless so indicated or as are readily apparent to one of skill in the art. The use of singular or plural in referring to "method" or "methods" and the like is not limiting. The word "or" is used in this disclosure in a non-exclusive sense, unless otherwise explicitly noted.

While this invention has been described in conjunction with the specific embodiments outlined above, it is evident that many alternatives, modifications and variations will be apparent to those skilled in the art. Accordingly, the preferred embodiments of the invention, as set forth above, are intended to be illustrative, not limiting. Various changes may be made without departing from the spirit and scope of this invention. The present invention shall be easily carried out by an ordinary skilled person in the art, and any modifications and changes are deemed to be within the scope of the present invention.

This written description uses examples to disclose the invention, including the best mode, and also to enable any person skilled in the art to practice embodiments of the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

What is claimed is:

1. A handsfree filter mask comprising:
    a base plate having a first side, a second side, a first opening, and a second opening, and wherein an edge of the base plate has a curved profile;
    a mouthpiece having a first end and second end wherein the first end of the mouthpiece is attached to the first opening of the base plate on the first side of the base plate, and wherein the second end of the mouthpiece has an ergonomic design for insertion into a wearer's mouth;
    a unidirectional exhaust port attached to the second opening of the base plate on the first side of the base plate;
    a filter lock having a profile designed to interface with the curved profile of the edge of the base plate; and
    a filter comprising a filter material sized to substantially cover the base plate, wherein the filter lock is directly coupled to an edge portion of the filter material and the edge of the base plate.

2. The filter mask of claim 1, wherein the exposed filter locking filter lock is an elastic material.

3. The filter mask of claim 1, wherein the mouthpiece is made from a flexible material.

4. The filter mask of claim 1, wherein the base plate has a concave shape.

5. The filter mask of claim 1, wherein the base plate and the mouthpiece are a unitary element.

6. The filter mask of claim 1, wherein first opening is positioned towards a top of the base plate and the second opening is positioned substantially in a line with the first opening and positioned towards a bottom of the base plate.

7. The filter mask of claim 1, wherein the filter mask is configured to extend a predetermined distance from the wear's face and does come in contact with the wear's face.

8. The filter mask of claim 1, wherein the mouthpiece is made from a material that is able to withstand the weight of the base plate, the filter lock, and the removable filter.

* * * * *